Patented Dec. 4, 1928.

1,693,644

UNITED STATES PATENT OFFICE.

WERNER P. ECKDAHL, OF CHICAGO, ILLINOIS.

WET PROCESS FOR MANUFACTURING CEMENT.

No Drawing. Application filed May 24, 1926. Serial No. 111,385.

This invention relates to a wet process for manufacturing cement.

In the usual wet process for manufacturing cement, the silicious material such as clay, blast furnace slag or the like and limestone in the correct proportion to form cement, is mixed with water in the correct proportion to form a slurry, which is then ground wet and fed into a kiln. One of the principal difficulties in carrying out such a process is that the slurry tends to set, due to hydration of the basic constituents of the silicious material. This is especially true when blast furnace slag is used.

It is therefore an object of this invention to provide a process for preventing the hydration of the basic constituents of the slag during the manufacture of the cement.

I have found that if carbon dioxide gas is blown through the slurry, preferably at an early stage in the manufacturing process, the hydration of the calcium and magnesium oxide or calcium and magnesium silicate constitutents of the slag is largely prevented. Instead of forming the hydroxides, these oxides, or the hydroxides if already formed, will be converted by the action of the carbon dioxide gas into the corresponding non-setting carbonates.

Since, in the manufacture of blast furnace slag, the kiln gases produced contain a relatively large percentage of carbon dioxide, I prefer to use these gases as a source of the carbon dioxide. A portion of the gases may be first cooled and then led through a distributing pipe into the bottom of a slurry tank, containing the slurry of finely ground slag and limestone, under sufficient pressure to aid in the agitation and mixing of the slurry. The carbon dioxide gas, of course, reacts with any basic oxides of the alkaline earths present in the slag and coats the individual particles of slag with a coating of carbonates that protects against subsequent hydration. Consequently, the danger of the slurry setting if left standing for any long period of time is eliminated.

Any suitable source of carbon dioxide gas may be used in place of the kiln gases. The time of treatment will vary according to the free basic content of the slag and can easily be determined by experiment. Where the cost of the carbon dioxide containing gas is negligible, such gas may be used continuously during the process for agitation, in place of air, to supplement mechanical agitation.

The same procedure may be followed during the wet grinding of the slag and limestone if any free basic reaction is found.

In the subsequent burning of the slag and limestone slurry, as usually carried out in rotary kilns, the carbon dioxide is driven off and may be recovered and reused.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. In the wet process of manufacturing cement, the step of passing cement kiln gases high in carbon dioxide through the slurry of ground silicious material and limestone before passing said slurry to the kiln.

2. In the wet process of manufacturing cement from blast furnace slag and limestone, the step of bringing carbon-dioxide-containing gases into intimate contact with the slag particles contained in a slurry of the slag and limestone for preventing the setting of the slurry.

3. The method of preventing the setting of a slurry of finely divided silicious material having a basic reaction, which comprises passing gases relatively high in carbon dioxide content into contact with said slurry.

In testimony whereof I have hereunto subscribed my name.

WERNER P. ECKDAHL.